United States Patent [19]
Kishitani

[11] 4,129,045
[45] Dec. 12, 1978

[54] CHAIN WITH BUSHING PROTECTIVE COVER

[75] Inventor: Keisuke Kishitani, Tokyo, Japan

[73] Assignee: Caterpillar Mitsubishi Ltd., Tokyo, Japan

[21] Appl. No.: 833,429

[22] Filed: Sep. 15, 1977

[51] Int. Cl.² ............... F16G 13/04; F16G 13/06; F16G 15/02
[52] U.S. Cl. .................. 74/255 R; 74/256; 305/58 R; 308/237 R; 403/158
[58] Field of Search ........... 74/255 R, 255 S, 256, 74/254, 247, 249, 251 R; 305/58 R, 57, 14; 308/237 R, 238; 403/151, 152, 158, 161, 162; 198/851

[56] References Cited
U.S. PATENT DOCUMENTS

| | | | |
|---|---|---|---|
| 586,956 | 7/1897 | Barker et al. | 74/251 R |
| 839,849 | 1/1907 | Horst | 74/255 R |
| 2,909,938 | 10/1959 | Sharp | 74/256 |
| 3,192,785 | 7/1965 | Pearson | 74/255 R |

Primary Examiner—Benjamin W. Wyche
Assistant Examiner—William R. Henderson
Attorney, Agent, or Firm—Charles E. Lanchantin, Jr.

[57] ABSTRACT

A chain includes a plurality of links, a plurality of pins and bushings for pivotally coupling the links together in cooperating pairs, a replaceable cover embracingly connected to each bushing for protecting the bushings external surface from wear, and a plurality of retaining elements individually on the links or on the bushings for anchoring each of the covers on the respective bushing.

14 Claims, 10 Drawing Figures

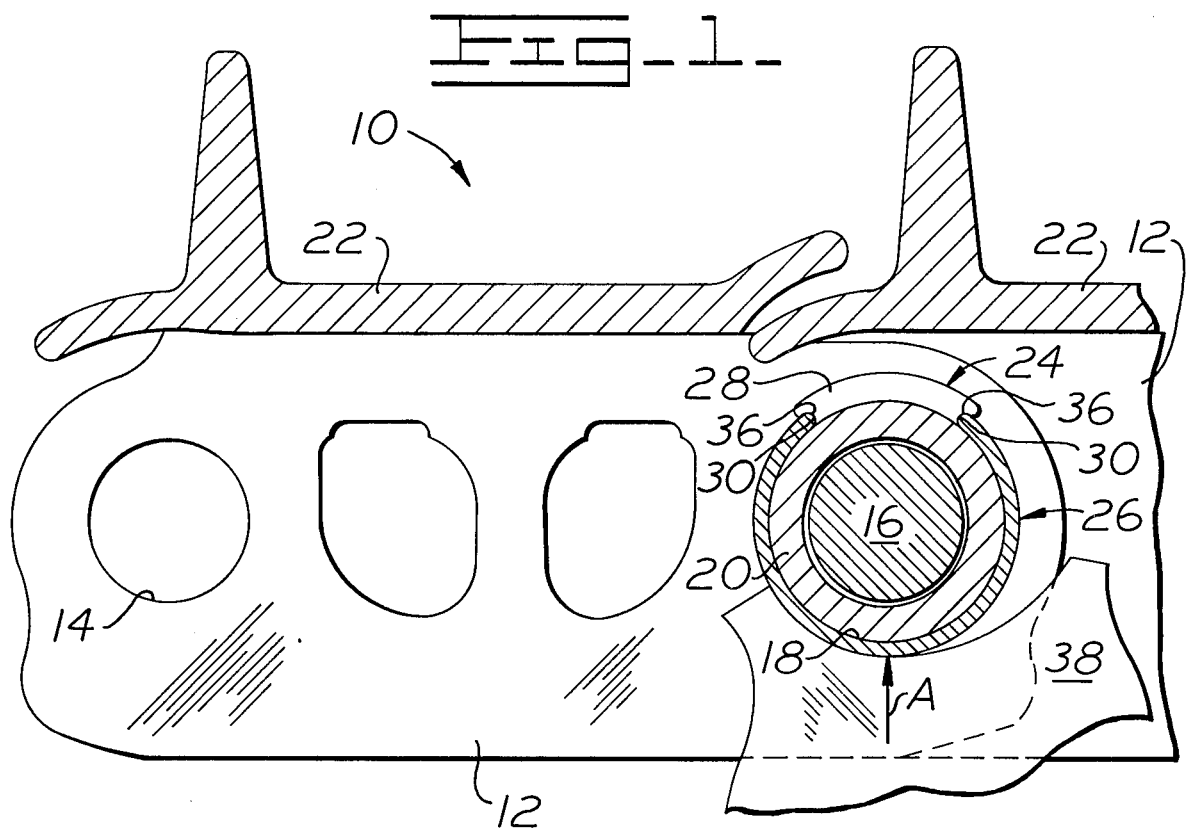
Fig-1-
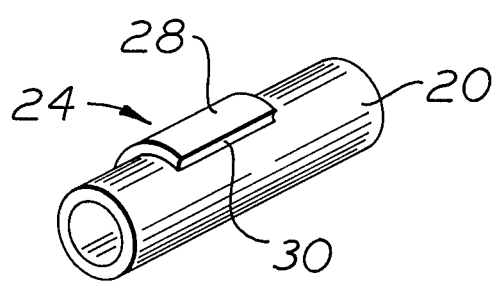
Fig-2-
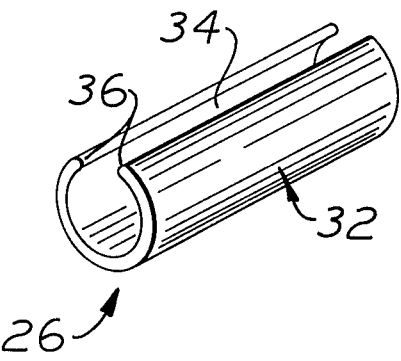
Fig-3-

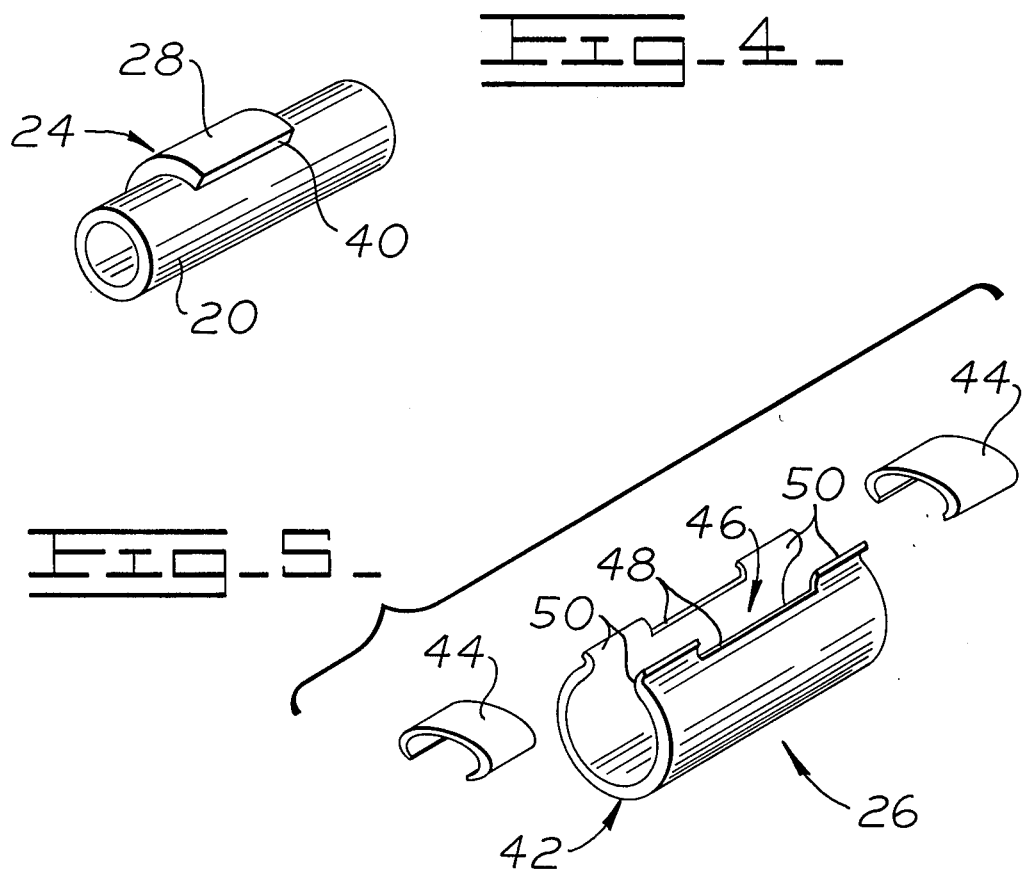
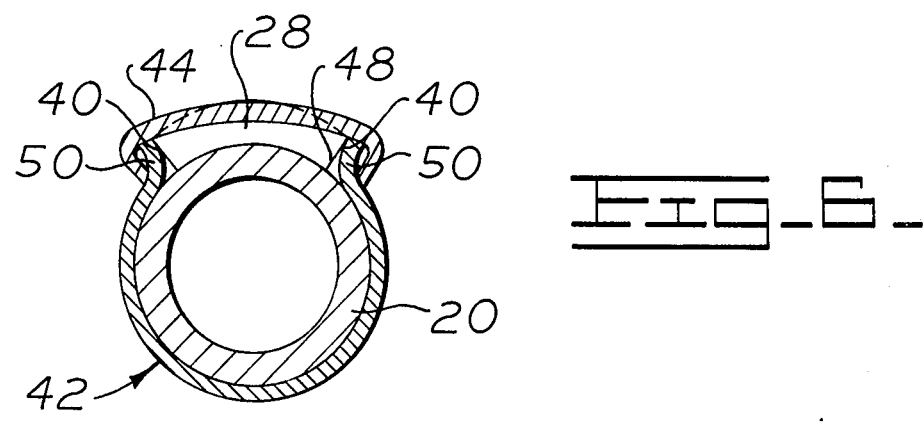

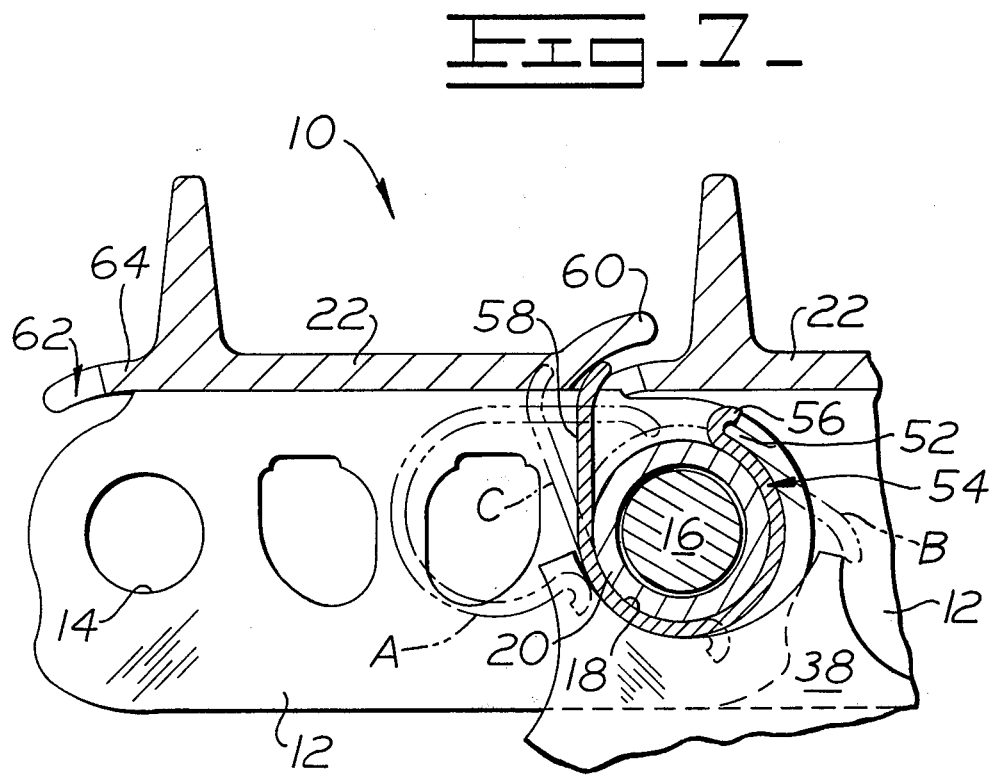
Fig_7_
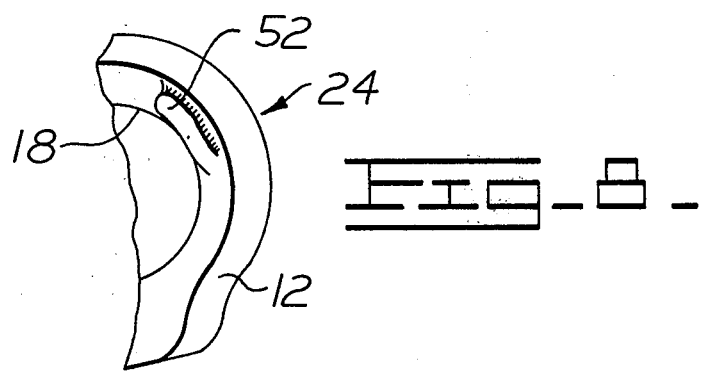
Fig_8_
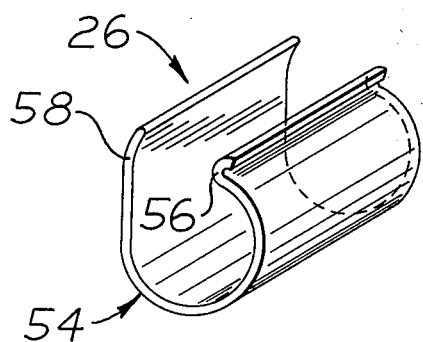
Fig_9_
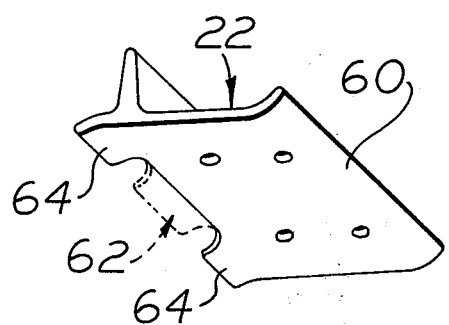
Fig_10_

CHAIN WITH BUSHING PROTECTIVE COVER

BACKGROUND OF THE INVENTION

The present invention is related to a wear protective cover for a chain, and more particularly to a replaceable cover for protecting the bushings of the chain from external wear.

Endless chains, particularly for track-type tractors, have experienced a marked increase in the service life of the pivotally connected pin and bushing joints with the introduction of improved seals and lubricants in the joints. While this has greatly diminished internal wear between the outer surface of the pin and the inner surface of the bushing of each joint, it has not materially affected external wear. Specifically, the outer surface of each bushing is engaged by a sprocket for driving the chain and is subjected to considerable external wear by the relative motion experienced therebetween. External wear of the bushings often progresses until is necessary to replace each worn bushing with a new bushing, which action requires disassembly of the entire chain at considerable expense.

In order to overcome the problem of external wear of the bushings, one proposal has been to employ a sleeve of abrasion-resistant polymer material over each of the bushings. Each sleeve is split along its length in order to fit over its respective bushing and to facilitate its replacement without disassembly of the chain. However, this proposal suffers from the disadvantage that the sleeve is rotatable on the bushing so that the inner surface of the sleeve and the outer surface of the bushing are worn.

Another proposal employs a protective cover consisting of a semicylindrical body which overlaps the usual outer wear surface of each bushing, and an attaching portion integrally connected to the body which is releasably secured to a track shoe. This offers the advantages of convenient replacement of the individual covers without disassembly of the chain and of a nonrotable mount which eliminates the problem of wear between the cover and bushing. On the other hand, this raises another significant problem in that during reverse operation of the chain external forces act on the free end of the cover and separate the cover from the bushing. As a result, earth and sand are forced into the clearance in a manner which accelerates wear or damage to the outer surface of the bushing or which leads to peeling off of the protective cover from the shoe.

SUMMARY OF THE INVENTION

The present invention is directed to overcoming one or more of the problems as set forth above.

According to the present invention there is provided a chain including a plurality of links, a plurality of pins and bushings for pivotally coupling the links together, a replaceable cover on each bushing for protecting the bushings from external wear, and retaining means on one of the links and the bushings for anchoring each of the covers in place on the respective bushing.

BRIEF DESCRIPTION OF THE DRAWINGS

FIG. 1 is a diagrammatic and fragmentary longitudinal cross sectional view of a track chain incorporating the bushing protective cover of the present invention.

FIG. 2 is a diagrammatic perspective view of the bushing shown in FIG. 1 at reduced scale with a cover engaging projection thereon.

FIG. 3 is a diagrammatic perspective view of the protective cover shown in FIG. 1 at reduced scale.

FIG. 4 is a view like FIG. 2 showing an alternate embodiment cover engaging projection.

FIG. 5 is an exploded and diagrammatic perspective view of an alternate embodiment protective cover and a pair of clamping members used therewith.

FIG. 6 is a diagrammatic longitudinal cross section of the alternate embodiment members of FIGS. 4 and 5 shown in an assembled condition.

FIG. 7 is a view similar to FIG. 1 of another embodiment chain and bushing protective cover.

FIG. 8 is a fragmentary view of the inside surface of one of the track links shown in FIG. 7 to better show the stop member thereon.

FIG. 9 is a perspective view of the replaceable cover shown in FIG. 7.

FIG. 10 is a perspective view of one of the track shoes illustrated in FIG. 7.

DETAILED DESCRIPTION

Referring to FIG. 1, there is shown a portion of a track chain 10 having a plurality of longitudinally arranged and overlapping links 12 disposed in side by side relation in two rows, although only one row is shown from the inside for illustrative convenience. A cylindrical hole 14 is formed in the leading or left hand portion of each link when viewing the drawing and a pin 16 is pressed into the opposite ones of these holes, and a cylindrical hole 18 is formed in the trailing or right hand portion of each link and a bushing 20 is pressed into the opposite ones of these holes. As a result of such conventional construction the symmetrically opposite pairs of links are pivotally coupled to the longitudinally adjoining pairs of links, with the respective bushings experiencing relative rotation on the pins 16. A track shoe 22 is laterally secured to each of the opposite pairs of links by bolts or the like in the usual manner.

Referring now to FIGS. 1, 2 and 3, retaining means 24 is provided in accordance with one form of the present invention for anchoring or preventing rotation of replaceable cover means 26.

More particularly, retaining means 24 preferably includes a projection or arcuately curved stop member 28 connected to the outer surface of each of the bushings 20. Preferably, each stop member is appreciably foreshortened in length relative to the full length of the bushing, although it may be extended for substantially the entire available length thereof between the opposite links 12. Each stop member has opposite side edges 30, and the arcuate width between the side edges should be smaller than half the circumference of the bushings. Preferably the width between the side edges is about one-fourth of the circumference of the bushings. Also, the opposite side edges should preferably have a concave contour as illustrated.

Turning now to the replaceable cover means 26, it is noted that such cover means preferably includes a cover 32 of spring steel for each of the bushings 20 with each cover having a generally C-shaped cross section. Thus, each cover is of substantially semicylindrical construction which defines a cut-away portion or slot 34 of uniform width across the cover. The width of the slot between a pair of opposite side edges 36 corresponds to the width between the side edges 30 of the stop member 28. The side edges 36 of the cover are preferably convex in cross section in order to interlockingly engage with the oppositely shaped or concave side edges 30 of the stop member as is illustrated in FIG. 1.

It is to be appreciated that the respectively contacting edges 30 and 36 can be reversed in contour from that shown by the drawings. Moreover, the width of the slot 34 need not be necessarily uniform over its entire length, but only the central portion thereof should be uniform in width to assure proper interlocking engagement of the cover 32 with the stop member 28.

From the foregoing it is clear that the covers 32 may be installed on the bushings 20 by pressing the covers radially inwardly on the bushings as is indicated by the force indicating arrow A in FIG. 1. They are positioned and retained positively in place not only by the resiliency or natural spring rate of the steel covers, but also by the interlocking engagement of the respectively facing and contoured side edges 30 and 36 of the stop members and the covers. This interlocking relationship is retained in either direction of rotation of a sprocket 38 relative to the track chain 10. Upon being worn by the sliding action of the sprocket the covers may be easily replaced by moving them in a direction opposite to the arrow A.

An alternate embodiment is shown in FIGS. 4 through 6, wherein the retaining means 24 includes a projection or arcuately curved stop member 28 similar to the preceding embodiment, except that a pair of side edges 40 thereof are flat, rather than being either concave or convex in cross section. The cover means 26 shown in FIG. 5 is also different in that it includes a cover 42 and a pair of clamping members 44.

The cover 42 is also preferably of spring steel formed into a semicylindrical cross section which defines a cut-away portion or contoured slot generally identified by the reference numeral 46 extending over the entire length thereof. A pair of opposed and centrally located side edges 48 are defined on the cover by the contoured slot, and also a radially outwardly extending portion or flange 50 is defined on the cover by the contoured slot symmetrically at each end of the side edges to form opposing pairs of flanges.

In operation, the cover 42 is fitted embracingly over the bushing 20 as shown in FIG. 6 so that its central edges 48 are preferably juxtaposed against the opposite side edges 40 of the stop member 28. Thereafter, the spring steel clamping members 44 of semicircular or C-shaped cross section are snap fittingly clamped over the respective pairs of flanges 50 to secure them together. Thus, the covers are securely connected to the bushings not only by the resiliency or spring rate of the cover itself, but also by the loading force contributed by the two clamping members.

It is further contemplated that the covers 32 or 42 may be more positively secured to the exterior surface of the bushings 20 by utilizing a suitable heat sensitive adhesive therebetween. The holding power of the adhesive can thereafter be neutralized or obviated by subjecting the assembled chain to a flux-heating technique. Subsequently, the covers can be individually removed for replacement as described heretofore.

Another alternate embodiment is illustrated in FIGS. 7 through 10, wherein the retaining means comprises a stop member 52 integrally embossed on the inside surface of the individual track links 12, rather than being a stop member on the bushings as described above. As shown best in FIG. 9, the cover means comprises a cover 54 of generally semicylindrical or more specifically J-shaped cross section having a rolled-over hem or hook means 56 on one edge and an upright end or substantially straight end 58 on the opposite edge.

In operation, the alternate embodiment cover 54 is initially installed in the phantom line position illustrated by the letter A in FIG. 7 before mounting of the track shoes 22 on the track chain 10. The covers are then forced or pressed rightwardly when viewing the drawing from the A position to the phantom line position illustrated by the letter B in opposition to their resiliency to embrace the bushings 20. Subsequently the covers are rotated in a clcokwise direction when viewing the drawing on the bushings until the hems 56 make interlocking engagement with the stop members 52 on the links 12 as shown by the letter C. The track shoes 22 are then installed on the links in such a manner that the shoes individually serve to bias the upright ends 58 of the covers into more secure and embracing contact with the bushings.

In reverse operation of the track chain 10 shown in FIG. 7, the covers 54 will be positively retained in place on the bushings 20 by the hems 56 contact with the stop members 52 as a result of the sprocket 38 tending to rotate the covers in a clockwise direction when viewing the drawing. On the other hand, in forward drive the upright ends 58 of the covers make contact with a tail or trailing portion 60 of each track shoe 22. A recess, generally identified by the reference numeral 62, is provided in a leading portion 64 of each shoe for the purposes of retaining a running clearance.

Other aspects, objects and advantages of this invention can be obtained from a study of the drawings, the disclosure and the appended claims.

The embodiments of the invention in which an exclusive property or privilege is claimed are defined as follows:

1. A chain comprising:
   a plurality of overlapping links arranged in two longitudinally oriented rows in laterally cooperating pairs;
   pin and bushing means for pivotally coupling said pairs of links together and including a plurality of pins and a plurality of bushings individually encircling said pins;
   replaceable cover means for protecting said bushings from external wear, said cover means including a plurality of releasable covers, each one of said covers being embracingly fitted over a respective one of said bushings; and
   retaining means on one of said links and said bushings for respectively anchoring each one of said covers in place on said respective bushing and preventing relative rotation therebetween.

2. The chain of claim 1 wherein said covers individually have a generally semicylindrical cross section.

3. The chain of claim 2 wherein each of said links has an inside surface and said retaining means includes a stop member extending from said inside surface of each of said links, rotation of said covers being individually prevented by abutment of said covers and said respective stop members.

4. The chain of claim 3 wherein each of said covers has hook means for interlocking connection with said stop members.

5. The chain of claim 2 wherein each of said bushings has an outer surface and said retaining means includes a projection extending outwardly from said outer surface of each of said bushings, rotation of said covers being prevented by engagement of said covers with a respective one of said projections.

6. The chain of claim 5 wherein said projections are arcuately curved plates connected to said bushings.

7. The chain of claim 6 wherein each of said plates has a pair of opposite side edges of concave shape, each of said covers has a pair of opposite side edges of convex shape, said side edges of said plates and said side edges of said covers being interlocked.

8. The chain of claim 1 wherein said retaining means includes a plurality of arcuately curved plates having opposite side edges, each of said plates being connected to a respective one of said bushings and defining a width between said side edges less than half the circumference of said bushings.

9. The chain of claim 8 wherein each of said plates has a width between said side edges of approximately one-fourth of circumference of said bushings.

10. The chain of claim 4 wherein said chain includes a plurality of track shoes and each of said covers has a straight end, said straight ends making contact with said track shoes.

11. The chain of claim 1 wherein said covers are of generally C-shaped cross section, each cover having a resiliency for embracingly fitting over one of the bushings, and clamping means for increasing the clamping force of each cover on the bushings.

12. The chain of claim 11 wherein said clamping means includes a resilient clamping member of generally C-shaped cross section.

13. In a chain of the type having a plurality of overlapping links arranged in two longitudinally oriented rows, pin and bushing means for pivotally coupling the links together in cooperating pairs and including a plurality of pins and a plurality of bushings individually encircling the pins, each of said bushings having an outer surface, the improvement comprising:
   a projection extending radially outwardly from said outer surface of each of said bushings; and
   a cover releasably fitting over said outer surface of each of said bushings, contacting one of said projections, and protecting said respective bushing from external wear.

14. In a chain of the type having a plurality of overlapping links arranged in two juxtaposed rows, each of said links having an inside surface, pin and bushing means for pivotally coupling the links together in cooperating pairs and including a plurality of pins and a plurality of bushings individually encircling the pins, the improvement comprising:
   a stop member located on the inside surface of each of the links; and
   a cover releasably fitting over each of said bushings, contacting said stop members, and protecting said respective bushing from external wear.

* * * * *